Sept. 20, 1927.  1,642,668
C. J. BREY
APPARATUS FOR FELLING TREES AND THE LIKE
Filed Oct. 23, 1924   4 Sheets-Sheet 4
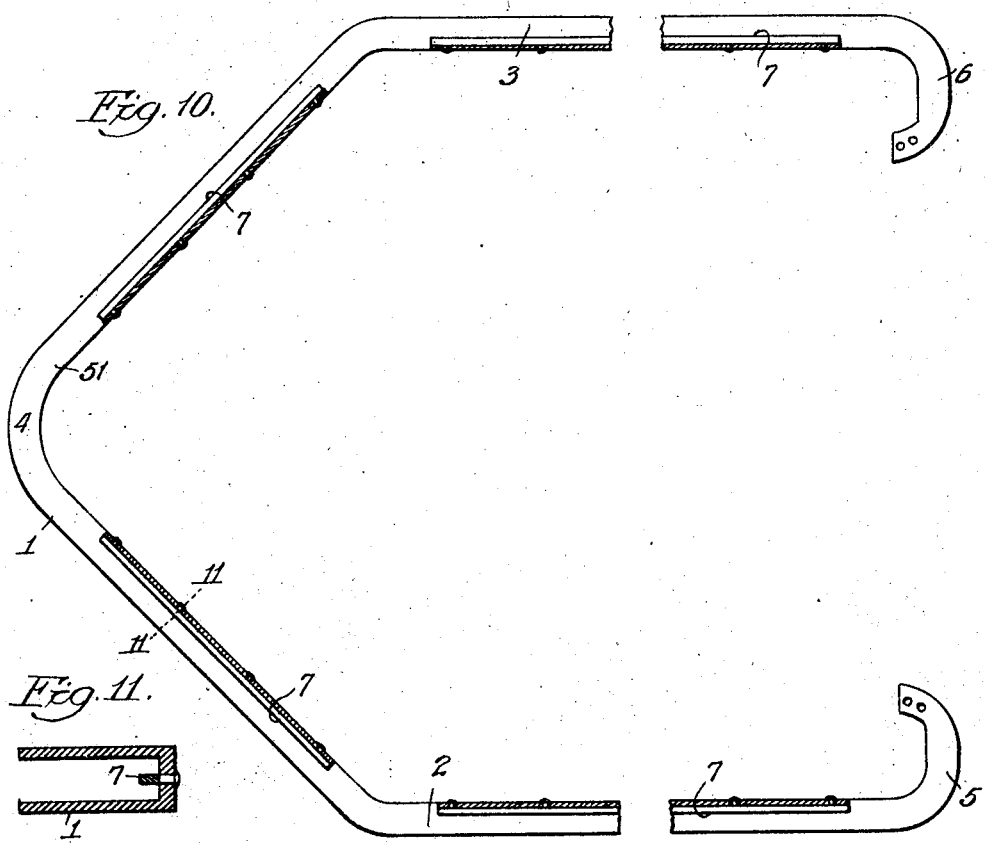
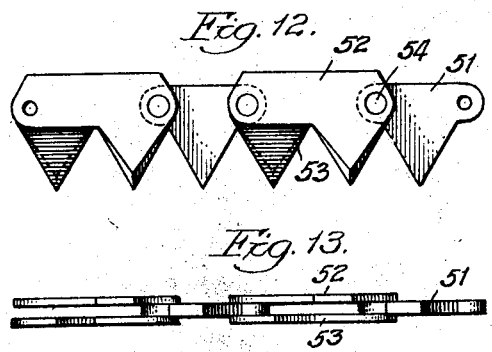
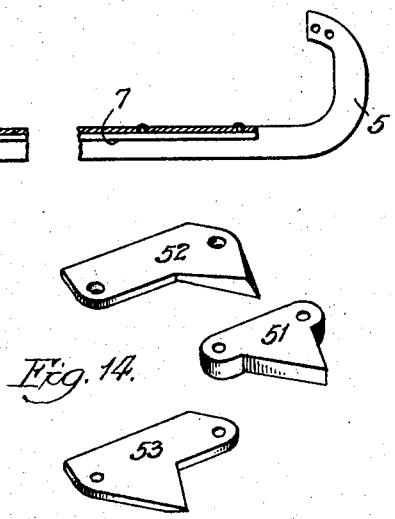
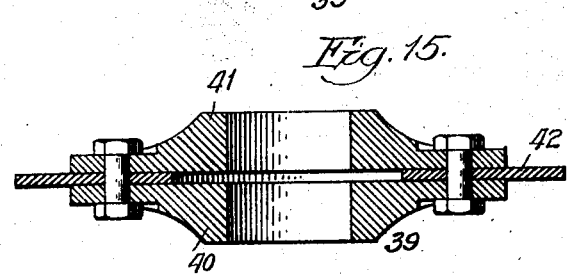
Inventor:
Charles J. Brey,
by Wallace R. Lane
Atty.

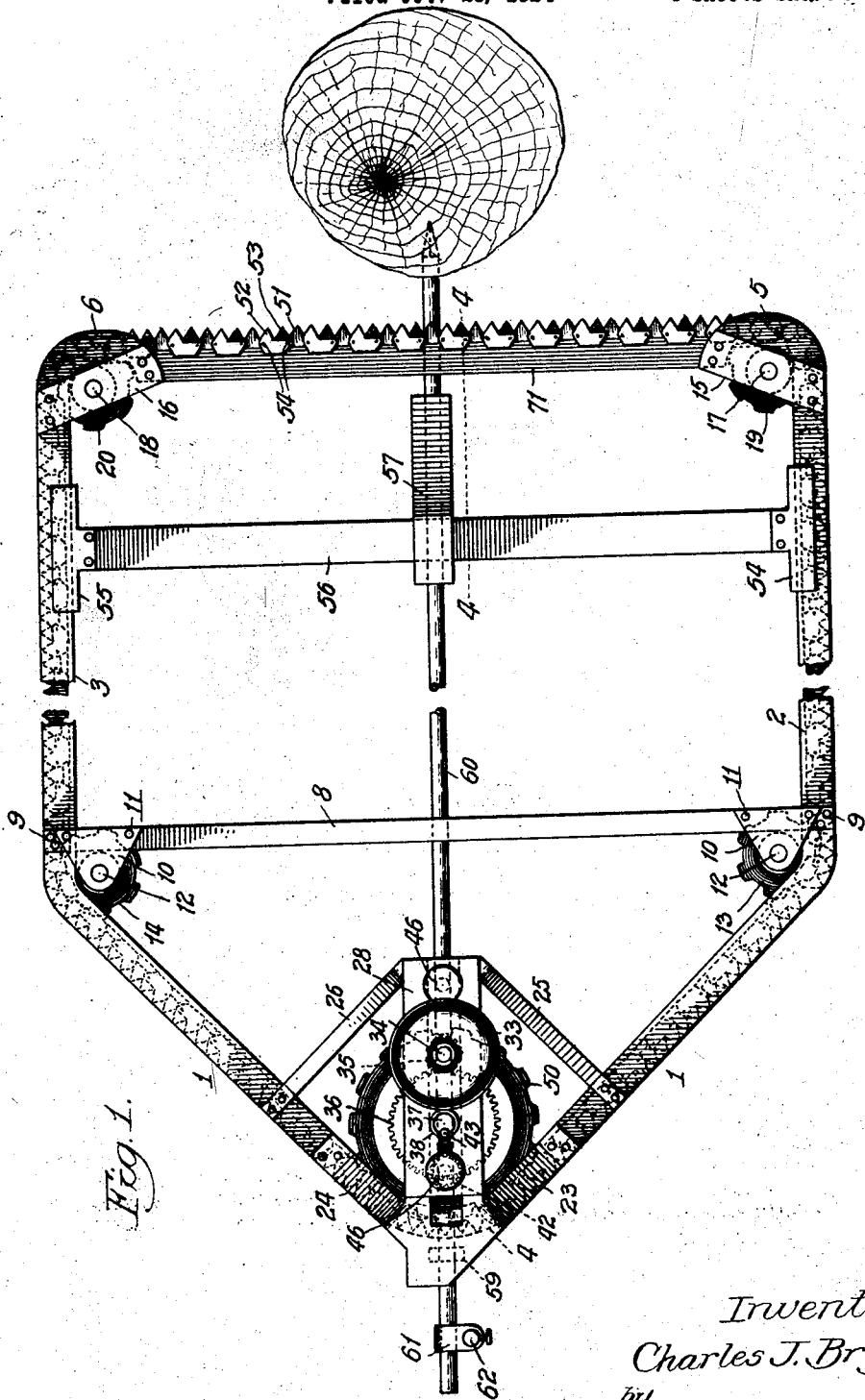

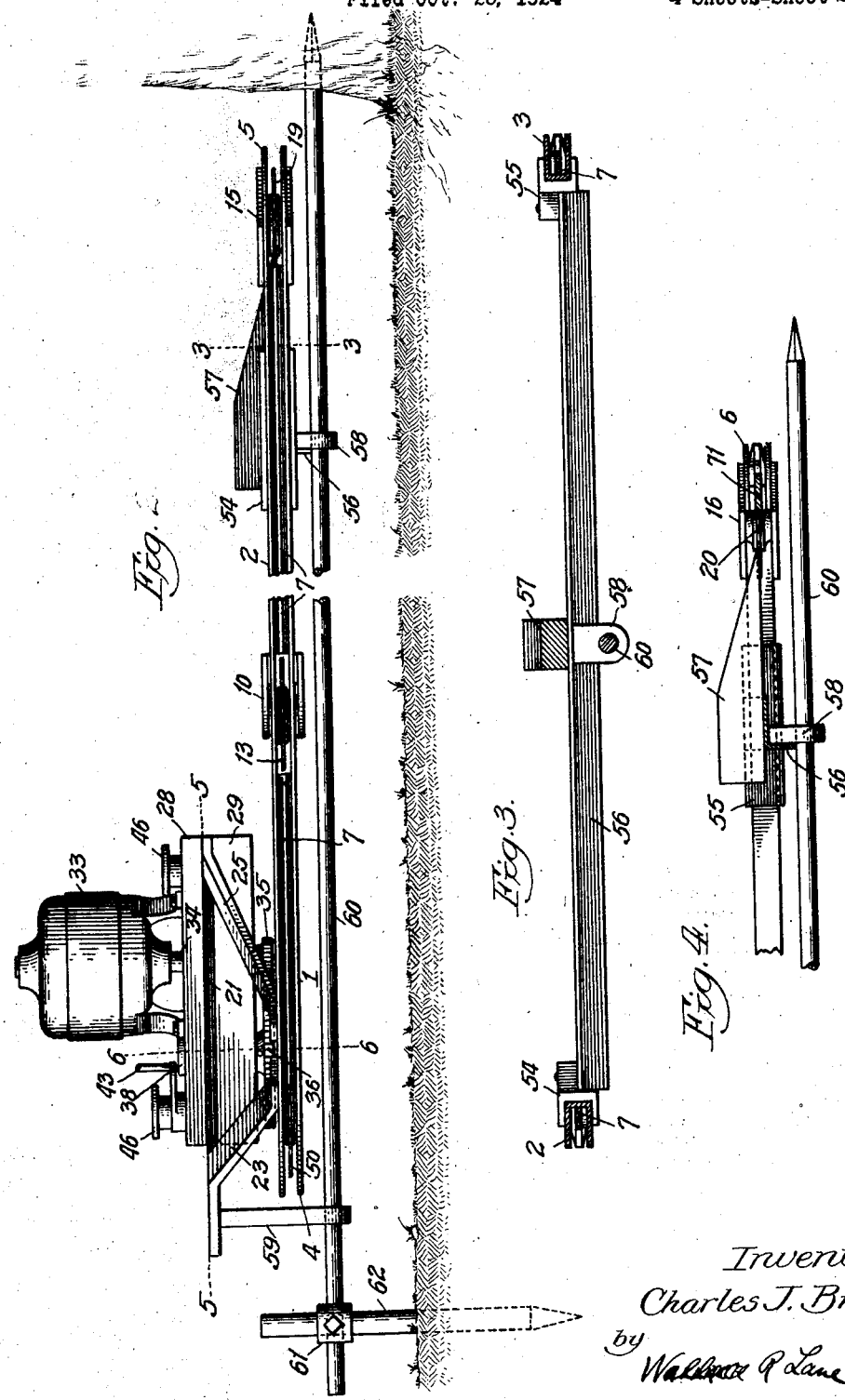

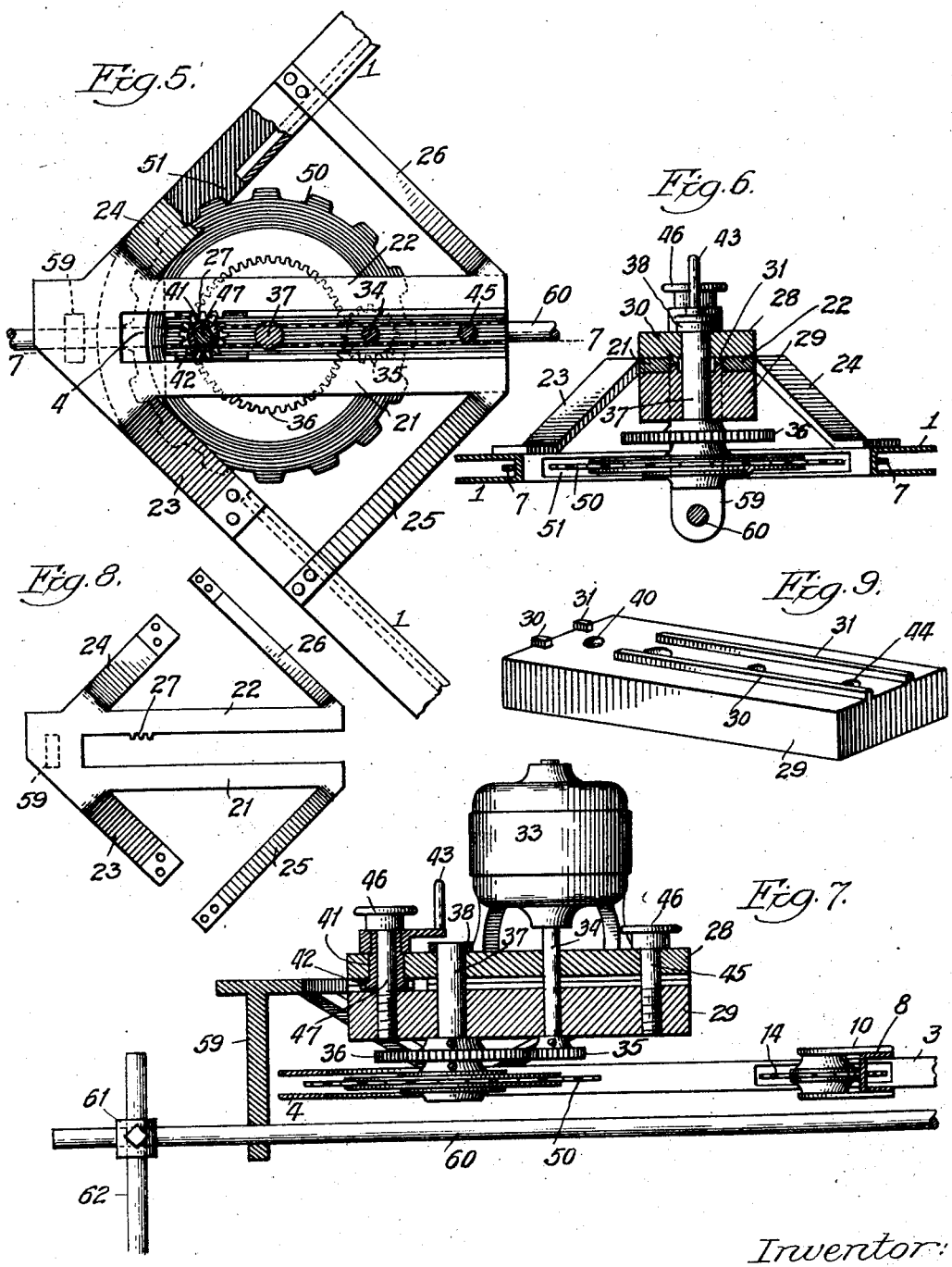

Patented Sept. 20, 1927.

1,642,668

UNITED STATES PATENT OFFICE.

CHARLES J. BREY, OF PARK FALLS, WISCONSIN.

APPARATUS FOR FELLING TREES AND THE LIKE.

Application filed October 23, 1924. Serial No. 745,304.

This invention relates to sawing apparatus of the chain saw type for felling trees and cutting them into proper lengths.

Among the objects of my invention are to provide a new machine for the felling and cutting of trees rapidly and economically, which machine is simple in construction and efficient in operation; to provide a power operated tree felling device wherein the driving mechanism for the chain saw may be readily detached from the device when in sawing position, to prevent possible injury to such driving mechanism in case the tree should fall on the device during the sawing operation; to provide a tree sawing device wherein the saw carriage is mounted to slide freely on a rod adapted to be anchored in the trunk of the tree, so that the saw carriage can be instantaneously moved relatively to the tree trunk to either feed the saw through the tree or remove the saw after the sawing operation; to provide a tree sawing device wherein the frame is provided with a simple and efficient construction for properly regulating the tension of the saw chain, together with a simple means for driving the saw chain from the source of power; to provide a simple adjusting means to regulate the tension of the saw carriage and in addition cooperative means for maintaining the adjusting mechanism in predetermined position; to provide a novel construction of a frame for the saw apparatus, which frame is adapted to house and form a guide-way for the traveling chain, and particularly to prevent lateral or wobbling movement of the chain; to provide a novel construction of saw chain wherein the toothed links of the saw chain are especially constructed to cooperate with the guide-way in the frame of the device; to provide a novel rigid frame construction for the saw chain, with particular reference to the forward portion of the frame or that portion which is adapted to enter the cut in the tree trunk; to provide a wedging device on the saw frame, which wedging device is adapted to enter the cut in the tree trunk so as to prevent the trunk of the tree from pinching the saw and preventing its efficient operation; to provide these and other objects of the invention which will be apparent from a perusal of the following specification when taken in connection with the accompanying drawings.

Referring now to the drawings in detail, Figure 1 represents a plan view of my improved tree felling apparatus.

Figure 2 represents a side view thereof.

Figure 3 is a view on section line 3—3 of Figure 2.

Figure 4 is a view on section line 4—4 of Figure 1.

Figure 5 is a detailed view, partly in section, of the chain tightening mechanism on the power drive.

Figure 6 is a side view thereof.

Figure 7 is a view on line 7—7 of Figure 5.

Figure 8 is a detailed view of the guide member for the sliding blocks.

Figure 9 is a perspective view of one of these blocks.

Figure 10 is a detailed view, partly in section, of the frame of the machine.

Figure 11 is a sectional view of the same taken on line 11—11 of Figure 10.

Figure 12 is an elevation view of the length of the saw chain.

Figure 13 in an edge view thereof.

Figure 14 comprises detailed views of the various lengths of the saw chain.

And, Figure 15 is a sectional view of the sprocket wheel for driving the chain.

Referring now to the drawings in detail, my improved device comprises the frame 1, which in the preferred construction is provided with side members 2 and 3 which converge at the rear to the apex 4. The front portions of the side members 2 and 3 preferably terminate in the rounded hook like ends 5 and 6. This frame has a cross-section like that shown in Figure 11 so as to provide a guide for the saw chain. And the bottom of this saw chain guide is preferably provided with upstanding slides 7, disposed at frequent intervals longitudinally of the guide. This slide is of sufficient width to make a snug fit between the bottom portions of the links of the saw chain so as to guidingly direct the saw chain as it travels in the channel frame and thus prevent it from wobbling or moving sidewise. The two hook like forward ends 5 and 6 of the frame are rigidly connected by means of the brace 71, which comprises a bar of band saw steel of the same thickness as the slide 7 and serves not only the purpose of stiffening the saw but also provides a guide over which the saw slides in its travel during the cutting operation.

As shown in Figure 1, the intermediate portion of the frame is provided with a cross brace 8 attached by suitable rivets 9 to the sides 2 and 3 of the frame. In order to propel the saw chain the frame is provided at suitable intervals with sprockets which are adopted to engage the links of the saw chain. These sprockets are preferably located at the apex 4 of the frame, at the two hook ends 5 and 6 of the frame, and also at the opposite points where the two sides 2 and 3 commence to converge toward the apex 4. To provide a suitable bearing the cross brace 8 is provided with spaced plates 10. These plates provide bearings for shaft 12 for the sprockets 13 and 14; in similar manner the hooked ends 5 and 6 of the frame are provided with plates 15 and 16 riveted to the frame at desired points. These plates 15 and 16 form bearings for shafts 17 and 18 carrying the sprockets 19 and 20. At the points of the frame opposite the sprockets, the frame is cut away so as to permit the sprockets to project through the frame and engage the rear portions of the saw chain. These sprockets provide suitable means for guiding and facilitating the travel of the chain around the frame. And it will be noted that by placing the sprockets at the corners or bends of the frame a bearing portion of great strength is afforded.

The sprocket wheel for driving the chain and the means for taking up the slack in the chain is preferably mounted at the apex 4 of the frame. To this end there is provided the bracket shown in particular in Figure 8 of the drawings. This bracket comprises two spaced guide members 21 and 22 and the depending braces or arms 23, 24, 25 and 26 provided at their ends with suitable holes for rivets by which the bracket is fit to the frame 1 of the apparatus. From an inspection of Figure 6 of the drawings it will be noted that the two parallel guide-ways 21 and 22 are in an elevated plane with respect to the frame 1 of the machine. The inner wall of the guide 22 is provided with teeth 27. The sprocket wheel for driving the saw chain and its prime mover are mounted on blocks 28 and 29 which slide in the space between the guides 21 and 22. These guides 28 and 29 are somewhat similar in construction except for a slight difference in thickness,—the lower guide 29 being thicker. The opposed faces of these guides 28 and 29 are provided with upstanding lugs 30 and 31 which are adapted to engage the sides of the guides 21 and 22 so that the blocks can slide along the guides 21 and 22 but are prevented from lateral movement relative thereto. The upper block 28 has mounted thereon an electric motor 33 or other prime mover. The shaft 34 of this motor passes through suitable openings in the upper and lower blocks 28 and 29. The bottom of this motor shaft has fixed thereto a pinion 35 which is adapted to mesh with a larger gear 36 fast on the end of a shaft 37 which also fastens to the upper and lower blocks 28 and 29. The upper end of this shaft 37 is made fast by means of a suitable nut 38 so that the shaft is prevented from moving endwise downwardly through the blocks 28 and 29. On shaft 37 below the gear 36 there is mounted a sprocket wheel 39. This sprocket wheel preferably consists of the two head members 40 and 41 suitably clamping between them an annulus 42 of thickness exactly to fit between the spaces on the rear sides of the links forming the saw chain. This annulus 42 preferably consists of a solid ring of steel the same thickness as the slide or guide 7 and the teeth of the sprocket which are cut in this ring are preferably arranged so that the raker teeth of the saw chain, hereinafter described, rest on that portion of the sprocket between the cut teeth, while the outside teeth of the chain rest on each side of the sprocket teeth thus preventing the chain saw from wobbling. All of the sprocket wheels are of similar construction except for differences in diameter. Adjacent one end, at the point 40', the upper block 28, and also the lower block 29, are provided with registering bores. The bore of the upper block 28 is of larger diameter and receives a sleeve 41' which is located at a point intermediate the slides 30 and 31. This sleeve is provided on its lower portion with a pinion 42' which is adapted to mesh with the teeth 27 on the side of guard 22 when the blocks are in operative position.

The upper end of this sleeve 41' is provided with a crank arm 43 by turning which, the pinion 42' is rotated so as to move the upper and lower blocks endwise in the guideways 21 and 22. This comprises the tensioning movement for the saw chain. Means is provided for retaining the blocks 28 and 29 in any adjusted position with relation to the guides 21 and 22. In the present instance the blocks 28 and 29 are provided at one end with apertures 44 through which pass a threaded bolt 45 having a turning head 46. Thus as the head engages the upper block 28 and since the threaded portion engages the threads in the lower block 29, rotation of the head 46 will serve to draw the blocks 28 and 29 close together and clamp them to the guides 21 and 22. A similar construction is provided for the opposite end of the blocks 28 and 29 except that in this construction the pin 47 passes through the sleeve 41 and threads into the lower block 29. This provides a very compact arrangement. The sprocket wheel 50 on the lower end of the shaft 37 is adapted to project through openings 51 in the frame of the machine. These openings 51 are illustrated in Figure 10 and lie between the slide members 7, as at the apex 4 and also at the other locations of the sprocket wheel. From the foregoing description it must be evident that by turning the crank 43 the pinion 42 will be rotated to move the blocks 28 and 29 lengthwise of the guides 21 and 22 and that since these blocks carry the sprocket wheel 50 the latter will be moved toward or away from the saw chain links to tighten or relieve the tension from the chain. It also must be manifest that by adjusting the head 46 of the clamping screws 45 and 47 the upper and lower blocks 28 and 29 can be retained in any adjusted position. Another advantageous feature of this construction resides in the means and conditions with which the blocks 28 and 29, together with the motor and sprocket wheels can be wholly detached from the frame. In other words, by sliding the blocks 28 and 29 with the mechanism thereon clear of the brackets and the slides 21 and 22, the whole driving apparatus can be moved to a position of safety in case there be eminent danger of a tree falling on the sawing device.

The saw chain itself comprises a succession of links, each link consisting of separate pieces. There are raker teeth and cutting teeth. These teeth are shown in Figures 12, 13 and 14. The raker tooth 51 has the two cutting teeth 52 and 53 attached to it on either side by rivet 54. These teeth are made from standard gauge band saw steel. The teeth 52 and 53 are set in the desired manner to provide clearance, the teeth 52 and 53 being staggered as illustrated in Figure 12 to facilitate sharpening. The bottom sides of the cutting teeth 52 and 53 extend somewhat below the bottoms of the raker teeth and as before stated the sprocket is so arranged that the raker tooth rests on that portion between the teeth of the sprocket while the outside cutting teeth 52 and 53 rest on each side of the sprocket teeth, thereby preventing the chain saw from wobbling. So also the bottom portions of the cutting teeth 52 and 53 straddle the slides 7 in the channel portions of the frame 1 and also the front bar brace 71.

The two lateral sides 2 and 3 of the frame 1 are machined so as to snugly receive slides 54 and 55 to which is rigidly fastened a cross brace 56 of L-shape cross-section. The upper portion or top of this brace 56 is provided with a wedge block 57, the point of which lies in the same plane with the traveling band saw. The thickness of this wedge is sufficient so that when the wedge is forced into the cut made by the band saw it will remove all strain or weight of the trunk of the tree from the front brace 71 or from the traveling saw chain. The bottom portion of this brace 56 is provided with a depending lug 58 provided with a hole or bore. In addition the rearmost portion of the bracket shown in Figure 8 is provided with a depending bracket 59 also formed with a bore which registers with the bore in the depending lug 58. These bores are adapted to receive the long rod 60 which is pointed at its forward end so that it can be driven into the trunk of the tree. In addition there is provided a bracket 61 having a bore through which rod 60 may pass and also having a transverse bore through which a rod 62 may pass. In addition, the bracket 61 is provided with a set screw to hold the bracket 61 at a definite position vertically of the rod 62. It must be evident that the rod 60 is driven into the trunk of the tree just below the point at which the tree is to be sawed and the frame is then mounted on this rod 60, the lug 58 and the arm 59 constituting the support for the frame. At the same time the rearmost end of the rod 60 is held at the desired elevation by driving the rod 62 in the ground and fastening the bracket 61 in position. By means of this mounting the entire forward part of the machine is held in place preparatory to cutting and also during the beginning of the cutting before the wedge can be driven. After a desired cut is made, the wedge is driven into the cut directly behind the brace 71 so as to prevent the tree from weighing down on the saw and pinching it. The process of cutting can be continued while the wedge is being driven. When the wedge is finally driven in place and little chance exists for the pinching of the saw, the operator removes the rod 60 and devotes his entire attention to the feeding of the saw. This is made possible due to the fact that the wedge 57 is mounted on the bar 56 which slides relatively to the frame so that as the wedge 57 is firmly held in the trunk of the tree, it also holds the bar 56 which thus forms a firm guide for the frame. The frame slides relatively to the wedge 57 and thus functions to feed the traveling band saw forwardly across the trunk of the tree. The rapid feeding of the saw toward the end of the cut and while the tree is falling helps to eliminate the kick back of the tree. In case of accident the operator may slide the machine off the rods or take the entire driving mechanism off and remove it thus saving the whole or part of the machine from possible breakage.

It must be manifest that if desirable the machine may be operated during the sawing operation by using the mounting rods 60 and 62 so that the frame can be slid therealong.

It must be evident that the foregoing description and the illustration of the present invention are not to be considered in any wise as restrictive of the scope of the invention but are presented merely for the purposes of illustration and description.

Having thus described my invention, I claim:

1. In a device of the class described, the combination of a relatively long rod adapted to be driven into the trunk of the tree adjacent the cut to be made therein, a saw frame having lugs provided with bores through which said rod passes, said frame being freely slidable along said rod, means for maintaining said rod in a substantially horizontal position, means forming a saw chain guide on said frame, a saw chain mounted on said frame and power operated means for causing said chain to travel whereby to saw the trunk of the tree as said frame is pushed into proximity to the tree, a brace slidingly mounted on said frame to be shifted longitudinally of the long rod, a wedge mounted on said brace, said brace having a member through which said rod slides.

2. In a device of the class described, the combination of a relatively long rod having a point adapted to be forced into the trunk of a tree, a saw frame having members provided with apertures through which said rod freely slides and constituting a sliding support for said saw frame, said frame having substantially parallel portions spaced apart and forming guides, a flexible saw chain slidably mounted in the parallel portions of said frame, power operated means for causing said chain to travel, a cross bar connecting the parallel portions of said frame and adapted to slide longitudinally thereof, a wedge disposed on said bar in the plane of said traveling saw and adapted to be driven into the cut made by said saw, said bar being shiftable relatively to the frame to permit said frame to be fed forwardly when said saw is firmly wedged in the cut of the tree made by the saw and said bar serving to support the parallel spaced portions of the frame.

3. In a device of the class described, the combination of a saw frame having spaced apart parallel channel-shaped guides, a chain saw operating therein, power means to drive said saw, a cross-bar having channel-shaped ends slidingly engaging the parallel spaced guides of the frame and adapted to slide parallel thereto, a wedge carried by said cross bar whereby said wedge may be shifted relatively to the frame of the saw to permit said frame to be fed forwardly when said saw is firmly wedged in the cut of the tree made by the saw.

4. In a device of the class described, the combination of a saw frame of channel-shaped cross-section and constructed and arranged to form a closed path of travel for a flexible saw chain, certain parts of said channel shaped member having a centrally outstanding slide extending longitudinally thereof, a flexible saw chain mounted in said channel portion of said frame to travel therein and to be held thereby, said chain having portions constructed and arranged to guidingly fit said slide, a plurality of sprocket wheels mounted on said frame and having their teeth engage said chain to drive it, and power operated means on said frame for driving one of said sprockets.

5. In a device of the class described, the combination of a saw frame forming a closed guide, a flexible saw chain adapted to travel in said guide, a bracket rigidly mounted on said frame, a bearing member detachably mounted on said bracket and adjustable relatively thereto, a prime mover carried by said bearing member, a sprocket wheel carried by said bearing members and adapted to engage the flexible saw chain, means for driving said sprocket wheel from said prime mover, means whereby said bearing member may be shifted relatively to said bracket, and means for holding said bearing member in any shifted position.

6. In a device of the character described, the combination of a saw frame providing a closed guide-way, a flexible saw chain traveling in said guide-way, a bracket on said saw frame providing spaced apart guides, a slide shiftable in said guides and completely detachable from said bracket, a sprocket wheel mounted on said slide and adapted to engage the saw chain to drive it, means for driving said sprocket wheel and means for holding said slide in any position on said bracket.

7. In a device of the class described, the combination of a saw frame, a flexible saw chain adapted to slide thereon, a bracket providing spaced guide-ways, said bracket having depending arms adapted to be attached to said frame whereby said guide-ways of said bracket are maintained in a plane elevated above that of the frame, a slide shiftably mounted in said guide-ways of said bracket, a sprocket wheel carried on said slide and adapted to engage the flexible saw chain to operate the same, and power means carried by said slide for driving said sprocket wheel.

8. In a device of the class described, the combination of a saw frame providing a closed guide-way, a flexible saw chain adapted to travel in said guide-way, a bracket rigidly connected to said saw frame, said bracket providing spaced apart guides, a pair of opposed blocks adapted to slide in said guide longitudinally thereof, a motor mounted on one of said blocks and having a shaft passing through said blocks, a pinion on the end of said shaft, a second shaft mounted in said blocks, a gear on said second shaft meshing with said pinion, a sprocket wheel on the end of said second shaft adapted to engage with said flexible saw chain, a sleeve mounted in one of said blocks and provided with a pinion on the end thereof, teeth on one of said guide-ways adapted to engage with said pinion, and means for shifting said sleeve to rotate said pinion whereby to shift said blocks longitudinally of said guide-way to adjust the tension of said flexible saw chain.

9. In a device of the class described, the combination of a saw frame providing a closed guide-way, a flexible saw chain adapted to travel in said guide-way, a bracket rigidly connected to said saw frame, said bracket providing spaced apart guides, a pair of opposed blocks adapted to slide in said guide longitudinally thereof, a motor mounted on one of said blocks and having a shaft passing through said blocks, a pinion on the end of said shaft, a second shaft mounted in said blocks, a gear on said second shaft meshing with said pinion, a sprocket wheel on the end of said second shaft adapted to engage with said flexible saw chain, a sleeve mounted in one of said blocks and provided with a pinion on the end thereof, teeth on one of said guide-ways adapted to engage with said pinion, means for shifting said sleeve to rotate said pinion whereby to shift said blocks longitudinally of said guide-way to adjust the tension of said flexible saw chain, and means for clamping said blocks to said guide-way whereby to move said blocks in adjusted position relatively to said guide-way.

10. In a device of the class described, the combination of a saw frame providing a closed guide-way, a flexible saw chain adapted to travel in said guide-way, a bracket rigidly connected to said saw frame, said bracket providing spaced apart guides, a pair of opposed blocks adapted to slide in said guide longitudinally thereof, a motor mounted on one of said blocks and having a shaft passing through said blocks, a pinion on the end of said shaft, a second shaft mounted in said blocks, a gear on said second shaft meshing with said pinion, a sprocket wheel on the end of said second shaft adapted to engage with said flexible saw chain, a sleeve mounted in one of said blocks and provided with a pinion on the end thereof, teeth on one of said guide-ways adapted to engage with said pinion, means for shifting said sleeve to rotate said pinion whereby to shift said blocks longitudinally of said guide-way to adjust the tension of said flexible saw chain, said blocks having pins passing therethrough and threadingly engaging one of said blocks and said pins having heads engaging the other of said blocks whereby on rotation of said pins said blocks are forced together to clamp the same to the guide-ways whereby to hold the blocks in adjusted position on said guide-ways.

11. In a device of the class described, the combination of a saw frame providing a closed guide-way, a flexible saw chain traveling therein, means for causing said chain to travel in said guide-way, a pair of shoes slidable along said saw frame, a cross brace rigidly connecting said shoes, a wedge mounted on said cross brace and having the point thereof disposed in the plane of said traveling saw.

12. In a device of the class described, the combination of a saw frame of channel like cross-section providing a housing, said saw frame having its forward ends rounded and spaced apart, a pair of sprocket wheels mounted in said rounded portion and adapted to engage the rear of the flexible saw chain to guide the same, and a channel-shaped brace rigidly connecting the spaced apart curved ends of the saw frame, said brace being of sufficient thickness to form a slide-way for the links of the saw chain, and said brace having a relatively thin slide projecting centrally from its face and forming a guideway for the chain links.

In witness whereof, I hereunto subscribe my name to this specification.

CHARLES J. BREY.